April 3, 1962   H. J. SPENCER   3,027,875
VALVE
Filed Dec. 13, 1957

INVENTOR.
Herman J. Spencer
BY 3,027,875
VALVE
Herman J. Spencer, Box 172, Ingomar, Pa.
Filed Dec. 13, 1957, Ser. No. 702,697
6 Claims. (Cl. 121—13)

My invention relates to a means to accumulate and release compressed air for operation of a staple driving piston or other extendable means to accomplish work, the release of accumulated compressed air being sudden and in volume whereby the force of the released air acts violently against the piston to thereby increase its velocity in working direction.

The following are objects of my invention:

To provide means that allow the induction of pressure air into the piston cylinder around the piston without moving it appreciably or at all in working direction until after the inducted air has unseated a large cylinder sealing valve to thereby permit sudden entry of a volume of pressure air into the cylinder to speed the piston in working direction.

To intermittently inject a pneumatic force against a valve to unseat it to thereby overpower an existing force being constantly applied against the valve to hold it seated with means thereafter permitting some of the unseating force to apply itself oppositely against the valve for seating it and means for exhausting the intermittent pneumatic force from areas where it was applied to the valve to move it.

To use pressure air in a cylinder to propel a piston therein in working direction with a portion of the pressure air being used to close or help close a cylinder sealing valve and to provide means for exhausting the pressure air thusly used from the cylinder when the valve is closed.

To provide means stated above to move the piston in working direction and to provide constant pressure air against the piston to reverse its movement as the pressure air is exhausted from the cylinder.

To provide a small, easy to operate valve to intermittently supply pressure air to unseat a hard-to-open large cylinder sealing valve.

Figure 1:
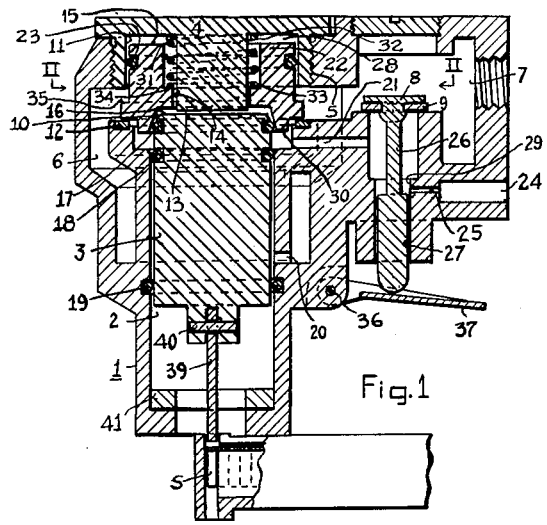
FIGURE 1 is a side elevation in section showing the parts in position before pressure air is supplied to unseat the cylinder sealing valve with the piston being held upwardly in its sealed engagement with said valve.
Figure 2:
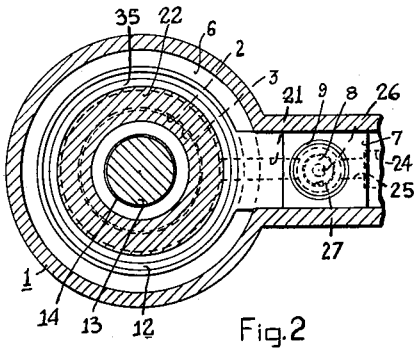
FIGURE 2 is a plan view through II—II of FIGURE 1.

My invention can be used in a pneumatic device such as a stapler including a cylinder having a piston actuated by compressed air. The piston is connected by pin 40 to a staple driver 39 which ejects a staple S from the stapler into a work piece. The piston is urged in working direction by a volume of compressed air suddenly applied against the piston. The piston is moved in reverse working direction by air pressure as shown herein or the usual spring means can be employed.

The stapling device shown in FIGURES 1, 2, 3 and 4 using the preferred form of my valve means has a housing 1 which contains a cylinder 2 open at its upper end to admit pressure air to said cylinder for moving the piston 3 therein in working direction, a cover 4 overlies the open upper end of cylinder 2 and cover 4 is secured to housing 1 by threads 5 to close the pressure air storage compartment 6 which extends above and around a portion of the outside of cylinder 2. A supply passageway 7 in housing 1 conducts unimpeded line pressure air to the storage compartment 6. A movable cylinder valve 22 has a seal 23 in a suitable groove around its body which rubs against the inwardly facing cylindrical shaped wall 11 of the storage compartment 6 to retain pressure air in the pressure air storage compartment 6 from passing by the cylinder valve 22. A seal 12 between the cylinder valve 22 and the upper end of cylinder 2 prevents leakage of pressure air from the storage compartment 6 into the upper end of the cylinder 2 when the cylinder valve 22 is seated. An abutment 13 which overlies the upper end of the cylinder 2 is adapted to limit upwardly movement of piston 3. A slight airway 14 between the abutment 13 and the cylinder valve 22 is adapted to permit pressure air in the upper end of cylinder 2 to seep into space 28 to exert downward pressure on the upwardly side 15 of the cylinder valve 22 when it is unseated to equalize the air pressure being exerted against its entire underside 38. A piston 3 in the cylinder 2 has a seal 17 in a groove around its circumference adjacent to the piston's upper end adapted to seat against the beveled underside 10 of the cylinder valve 22 to seal off the upper end 16 of the piston 3 from pressure air injected into the upper end of the cylinder 2 to prevent the pressure air from moving the piston 3 in working direction. A short distance downwardly from seal 17 on piston 3 is another groove containing a second seal 18 which extends outwardly a slight amount from the circumference of the piston 3 to prevent leakage of pressure air in the cylinder 2 past the piston 3. A cylinder seal 19 in a groove in the internal wall of the cylinder 2 rubs against the circumference of the piston 3 to prevent air leakage and to form an abutment for pressure air to expand against. An opening 20 through the cylinder's wall from the pressure air compartment 6 is located just above the cylinder seal 19 and opening 20 is always between the cylinder seal 19 and the second seal 18 on piston 3 so that the air expanding upwardly from against the cylinder seal 19 will push against the second seal 18 on the piston 3 to constantly urge it upwardly in reverse working direction to the piston's sealed position against the cylinder valve 22. A passageway 21 connects the supply passageway 7 to the inside of cylinder 2 close by its open end to conduct pressure air into cylinder 2 beneath the seated cylinder valve 22 to move it upwardly off of seal 12 to permit a volume of pressure air to suddenly enter the upper end of the cylinder 2 from pressure air compartment 6 and to move the cylinder valve 22 out of engagement with the seal 17 on piston 3 when it is stopped by abutment 13 so that the pressure air can then apply its force to the exposed upper end 16 of the piston 3 to urge it in working direction. See FIGURES 1, 3 and 4.

Figure 3:
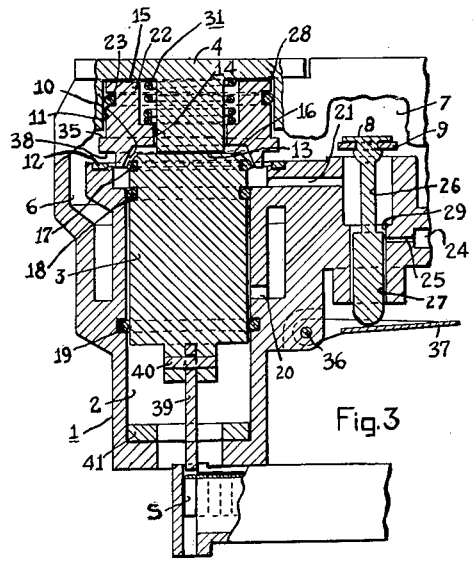
FIGURE 3 is a view similar to FIGURE 1 showing the small valve as having been manually unseated to thereby admit pressure air into the cylinder to unseat the cylinder sealing valve to move it from engagement with the piston so it can be projected in working direction by the pressure air.

A manually operated valve 8 is astride passageway 21 to control the flow of pressure air from supply passageway 7 to the cylinder 2. Manual valve 8 has a seal 9 which when seated, as shown in FIGURE 1, stops the flow of pressure air to passageway 21. An exhaust port 24 has a narrow opening 25 into the cylindrical shaped guide section 29 of passageway 21 located between the seal 9 of the manual valve 8 and the cylinder 2 to exhaust pressure air from it when valve 8 is seated. The seal end 9 of valve 8 is disk shaped and extending a short distance downwardly from its center is a stem 26 of small diameter which has an enlarged end section 27. The enlarged end section 27 of valve 8 fits closely in the guide section 29 of passageway 21 to minimize leakage of pressure air past it and to effectively block off the narrow opening 25 to the exhaust port 24 when the valve 8 is unseated as shown in FIGURE 3.

The preferred form of my valve shown in FIGURES 1, 2, 3 and 4 operates as follows: In the starting position shown in FIGURE 1, the cylinder valve 22 is seated on seal 12, the seal 17 of piston 3 is seated against the beveled underside 10 of the cylinder valve 22 with the upper end 16 of the piston 3 being a slight distance below the abutment 13, seal 9 of the manually operated valve 8 is seated blocking pressure air to passageway 21 and the enlarged end section 27 of valve 8 is not blocking the narrow opening 25 to the exhaust port 24 so that normal air pressure prevails in the slight space 28 above the upwardly side 15 of cylinder valve 22 and the slight airway 14 leading to it, the upper end of the cylinder 2 and therefore underneath the exposed area 30 of the underside of cylinder valve 22 shown in FIGURE 1 are open to the atmosphere via passageway 21, narrow opening 25 to the exhaust port 24. In FIGURE 1, line pressure air is in the supply passageway 7, the storage compartment 6, in the cylinder 2 around the piston 3 expanding between cylinder seal 19 of the cylinder 2 and seal 18 of the piston 3 and is urging it upwardly thereby holding seal 17 of piston 3 against the beveled underside 10 of cylinder valve 22, spring 31 has one end 32 against the underside of cover 4 with its other end 33 pushing against shoulder 34 of valve 22 to urge it to seat itself on seal 12 and pressure air in the storage compartment 6 is constantly exerting pressure on flange 35 of cylinder valve 22 for the same purpose.

Figure 4:
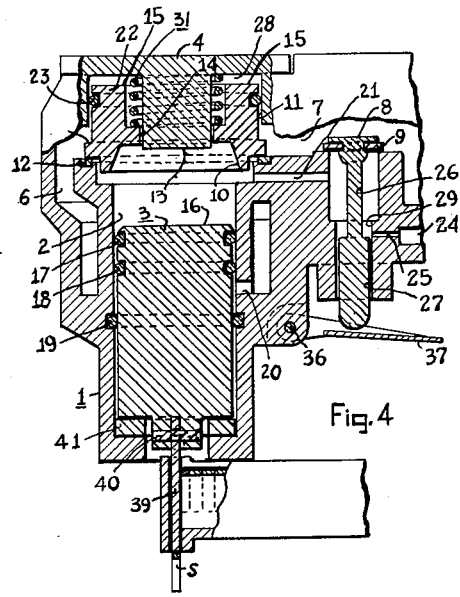
FIGURE 4 is a view similar to FIGURES 1 and 3 but showing the piston as having been moved in working direction, the cylinder sealing valve having been seated by the cylinder valve spring and showing the manually operated valve seated to thereby stop pressure air passing it to the cylinder with an opening to the exhaust port from the cylinder to exhaust it and the space above the cylinder valve.

The trigger 37 is pivoted counterclockwise on the housing supported pin 36 against stem 26 of valve 8 to unseat it and move its enlarged stem portion 27 to block off the narrow opening 25 to the exhaust port 24. With valve 8 now open, as shown in FIGURE 3, the pressure air from the supply passageway 7 moves through passageway 21 into the upper end of cylinder 2 to exert more upward pressure against the exposed underneath area 30 of cylinder valve 22 than the existing downward pressure against the cylinder valve 22 to thereby unseat and move it upwardly out of reach of seal 17 of piston 3 as it is stopped by abutment 13 (see FIGURE 3) to thereby permit a volume of pressure air from the storage compartment 6 to contact the now exposed upper end 16 of piston 3 to thereby move it in working direction to the limit of its travel against stop 41 to drive staple S. See FIGURES 1, 3 and 4. While the piston 3 is moving in working direction, the pressure air in the open end of cylinder 2 seeps upwardly via the slight airway 14 between the abutment 13 and the cylinder valve 22 to space 28 to thereby exert downward pressure against the upper surface 15 of the cylinder valve 22 which is equal to the air pressure now being exerted against its entire underside 38 to thereby permit spring 31 to urge cylinder valve 22 downwardly to seat it against seal 12 to stop the flow of pressure air from the storage compartment 6 to the upper end of the cylinder 2. See FIGURE 4. The trigger 37 is released as shown in FIGURE 4 and pressure air on top of the seal 9 and of valve 8 moves it downward until its seal 9 covers passageway 21 to thereby stop pressure air from entering it. As the manually operated valve 8 is seated, its enlarged stem portion 27 was moved from blocking the narrow opening 25 to the exhaust port 24 to thereby allow all pressure air from space 28 above the cylinder valve 22 as well as that in the cylinder 2 above the piston 3 to exhaust itself through passageway 21, narrow opening 25 to the exhaust port 24 as the piston 3 is moved upwardly in reverse driving direction to its starting position shown in FIGURE 1 by expansion of pressure air against seal 18 of piston 3. When the cylinder valve 22 has been unseated, the pressure air is against its entire underside and then seeps to its entire upper side which are equal and therefore spring 31 actually closes the cylinder valve 22 but when it is closed and the pressure air is exhausted, the spring 31 plus pressure air on flange 35 of cylinder valve 22 are holding it seated.

I claim:

1. In a pneumatic device to apply intermittent pressure air to a piston to urge it in working direction, a pressure air storage compartment in said device, a cylinder in said device open at one end to receive pressure air from said storage compartment for urging a piston in working direction, a reciprocating piston in said cylinder adapted to be moved in working direction by pressure air inducted into said cylinder, a movable cylinder valve that is normally seated for closing the open end of said cylinder to pressure air from said storage compartment, means for intermittently conducting pressure air into said cylinder for unseating said cylinder valve to expose said cylinder to pressure air from said compartment, a releasable seal normally in sealing engagement between the upper end of said piston and the underside of said normally seated cylinder valve to prevent pressure air conducted into said cylinder while said valve is seated from moving said piston in working direction until after said conducted pressure air in said cylinder has unseated said cylinder valve to thereby admit pressure air into said cylinder from said storage compartment.

2. Claim 1 and further characterized by means for urging said piston in reverse working direction towards and into its sealed engagement with said cylinder valve, a stop for limiting movement of said piston in reverse working direction when said cylinder valve is being moved by said conducted pressure air to thereby break the seal between said cylinder valve and said piston to thereby expose the piston to pressure air from said storage compartment.

3. In a pneumatic device, the combination of a cylinder, a piston reciprocably mounted in said cylinder, a pressure air storage compartment in communication with said cylinder for supplying pressure air to said cylinder for moving said piston in working direction, movable means that is seated for blocking pressure air in said storage compartment from said cylinder, means for conducting pressure air into said cylinder to unseat said movable means to thereby admit pressure air from said storage compartment to enter said cylinder to move said piston in working direction.

4. In a pneumatic device to apply pressure air to a piston to urge it in working direction, a cylinder having one end normally closed to pressure air in said device, a reciprocating piston in said cylinder, means for limiting movement of said piston towards the closed end of said cylinder, movable releasable sealing means normally in sealing engagement with the upper end of said piston to prevent pressure air conducted into said normally closed end of said cylinder from moving said piston in working direction, means for conducting pressure air into the closed end of said cylinder to move said sealing means relative to said piston to expose the piston to pressure air in said cylinder.

5. In a pneumatic device to apply pressure air to a piston to urge it in working direction, a pressure air storage compartment in said device, a cylinder in said device open at one end to receive pressure air from said storage compartment for urging a piston in working direction, a reciprocating piston in said cylinder adapted to be moved in working direction by pressure air in said cylinder, a movable cylinder valve that is normally seated for closing the open end of said cylinder to pressure air from said storage compartment, means for conducting pressure air into said cylinder for unseating said cylinder valve and to apply pressure gradually to said cylinder valve to urge the latter towards its seated position.

6. In a pneumatic device to apply pressure air to a piston to urge it in working direction, a pressure air storage compartment in said device, a cylinder in said device open at one end to receive pressure air from said storage compartment for urging a piston in working direction, a reciprocating piston in said cylinder adapted to be moved in working direction by pressure air in said cylinder, a movable cylinder valve that is normally seated for closing the open end of said cylinder to pressure air from said storage compartment, means for conducting pressure air into said cylinder for unseating said cylinder valve to thereby expose said cylinder to pressure air from said storage compartment and means thereafter permitting pressure air in said cylinder to gradually apply pressure against said cylinder valve to urge the latter in a direction towards its seated position.

References Cited in the file of this patent

UNITED STATES PATENTS

| | | |
|---|---|---|
| 502,497 | Lounsbery | Aug. 1, 1893 |
| 2,406,747 | Davis | Sept. 3, 1946 |
| 2,677,933 | Hopkinson | May 11, 1954 |
| 2,687,522 | Juilfs | Aug. 31, 1954 |
| 2,854,953 | Osborne | Oct. 7, 1958 |
| 2,872,901 | Goldring et al. | Feb. 10, 1959 |
| 2,944,522 | Doyle | July 12, 1960 |

FOREIGN PATENTS

| | | |
|---|---|---|
| 769,544 | Great Britain | Mar. 6, 1957 |